United States Patent [19]

Bihler

[11] 3,937,197

[45] Feb. 10, 1976

[54] HEATING MEANS FOR THE INTAKE SYSTEM OF A WATER-COOLED COMBUSTION ENGINE

[75] Inventor: Wolfgang Bihler, Bad Friedrichshall, Germany

[73] Assignee: Audi NSU Auto Union Aktiengesellschaft, Neckarsulm, Germany

[22] Filed: Mar. 18, 1974

[21] Appl. No.: 451,774

[30] Foreign Application Priority Data

Mar. 22, 1973 Germany............................ 2314250

[52] U.S. Cl............................ 123/122 H; 173/122 R
[51] Int. Cl.² ........................................ F02M 31/00
[58] Field of Search ...... 123/122 H, 122 R, 122 AB

[56] References Cited
UNITED STATES PATENTS

| | | | |
|---|---|---|---|
| 1,232,041 | 7/1917 | Johnson............................ | 123/122 H |
| 1,330,700 | 2/1920 | Giesler............................ | 123/122 H |
| 2,372,272 | 3/1945 | Helmore......................... | 123/122 H |

FOREIGN PATENTS OR APPLICATIONS

| | | | |
|---|---|---|---|
| 1,168,638 | 4/1902 | France............................ | 123/122 H |

*Primary Examiner*—Charles J. Myhre
*Assistant Examiner*—R. H. Lazarus
*Attorney, Agent, or Firm*—Kane, Dalsimer, Kane, Sullivan and Kurucz

[57] ABSTRACT

A water-cooled combustion engine has a pump-operated cooling water circuit passing through the cooler when the engine is hot. The cooler is rendered inoperative by a thermostat-controlled by-pass line when the engine is cold. The heating means for the intake system for the engine has a cooling water chamber whose supply line is fed with heated cooling water. The circuit of the heating means is arranged parallel with the cooling circuit through the by-pass line. This heating means is automatically switched off without additional aids as the engine temperature rises, when the by-pass line is shut off by the thermostat valve.

3 Claims, 1 Drawing Figure

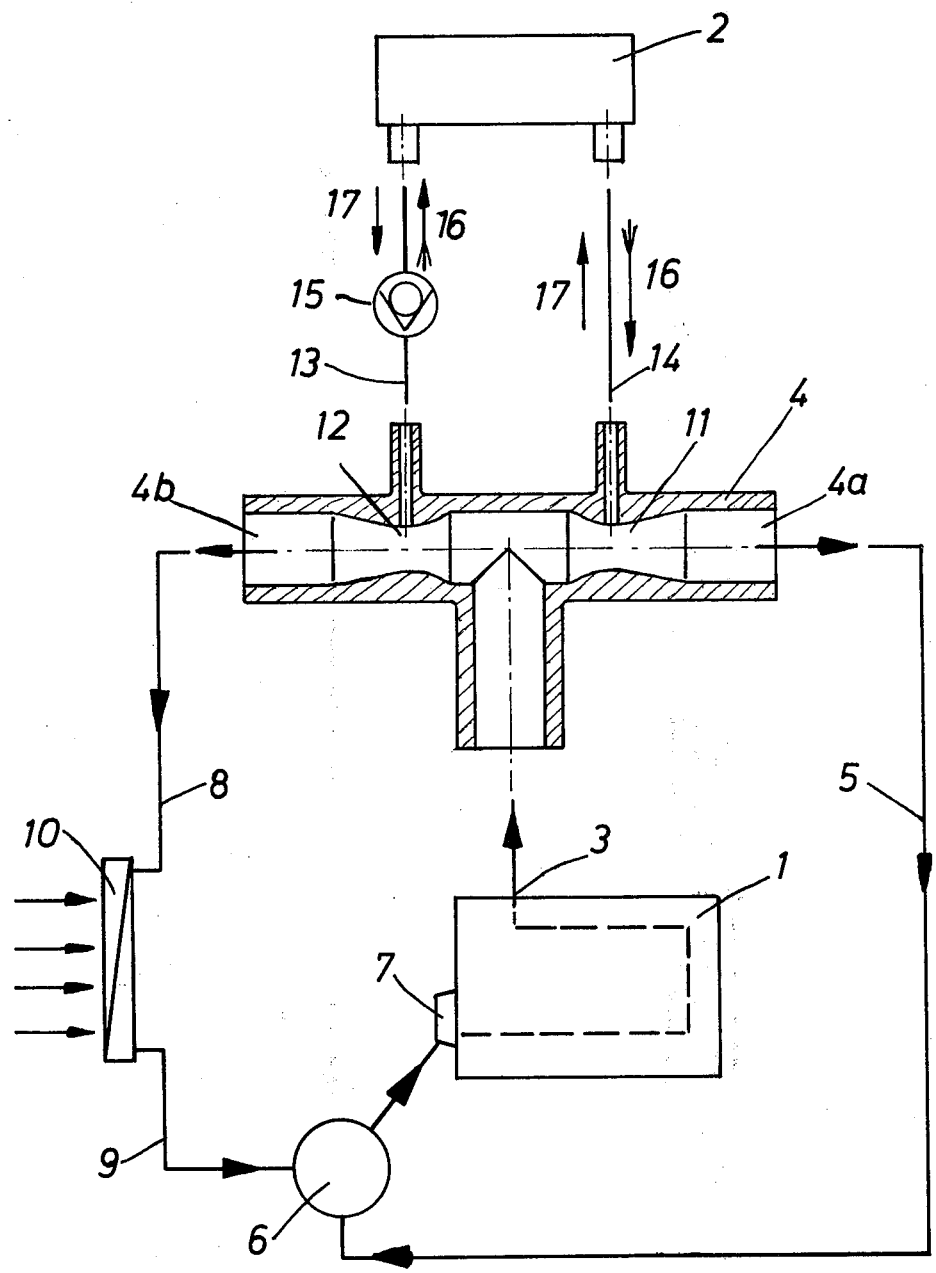

HEATING MEANS FOR THE INTAKE SYSTEM OF A WATER-COOLED COMBUSTION ENGINE

BACKGROUND OF THE INVENTION

It has been proposed that the thermostat valve control acting on the by-pass line because of its arrangement also be simultaneously employed to control the heating means. It has been found, however, that conventional thermostat valves do not function with sufficient precision, so that the by-pass line is not shut off completely when the selected cooling water temperature is reached. Consequently, the heating means may be traversed to a slight extent by heated cooling water. In that case, the intended shut-off will be at least in part ineffectual, since the fresh gases being supplied to the engine continue to be heated, though not to any high degree.

SUMMARY OF THE INVENTION

The object of the invention is to prevent the heating means from continuing to be traversed by heated cooling water after a certain cooling-water temperature has been reached.

In order to accomplish this objective, the supply line of the heating means branches off from the engine cooling circuit line leading to the cooler and contains a check valve. In this arrangement, the cooling water leaving the engine in the warming-up phase is able to pass through the heating means by the control exercised by the thermostat valve. In this manner, when the selected cooling-water temperature is reached and assuming the thermostat valve is actuated and fails to shut off the by-pass line completely, the flow through the line leading to the cooler is considerably greater than the flow through the by-pass line thereby reversing the direction of flow through the heating means. But flow in this direction is prevented by the check valve.

Preferably, the supply line of the heating means is connected to the suction side of a venturi arranged in the engine cooling circuit line leading to the cooler, and the return line to the suction side of a venturi arranged in the by-pass line.

The pressure gradient required to operate the cooling water circuit of the heating means is produced during the warm-up phase with the aid of the venturi arranged in the by-pass. The suction side of the by-pass line is connected to the return line of the heating means so that the heating means is set in operation.

When the engine is hot, the thermostat valve switches over, so that the cooling water flows entirely or at least predominantly through the cooler, and generates a greater suction in the venturi arranged in the line leading to the cooler than in the venturi arranged in the by-pass line, so that the flow through the heating means is reversed. This reversed flow is stopped by the check valve arranged in the supply line, thus dependably putting the heating means out of operation.

The point in time at which the flow in the heating means is reversed can be determined by the ratio of proportion of the cross-sections of the venturis to each other. The larger the venturi arranged in the line leading to the cooler, for example, reversal and consequently shut-off of the heating means can occur later in time.

In a further refinement of the invention, with an engine having a header arranged at the cooling-water outlet of the engine, a connection is provided for the engine-cooling circuit line leading to the cooler as well as a connection to the by-pass line. The venturis are conveniently arranged in this pair of connections. The connections of the lines leading to the heating means may thus advantageously be located in the same place, since the pressure differential required to force the water through the heating means is generated by the venturis.

Within the scope of the invention, the venturis with their suction nozzles may alternatively be arranged elsewhere in the cooling water line; likewise, the check valve of the supply line may be arranged in the header or in the intake system.

BRIEF DESCRIPTION OF THE DRAWING

An exemplary embodiment of the invention is schematically represented in the drawing and will now be more fully described.

DETAILED DESCRIPTION

The drawing shows a combustion engine 1 whose intake system is equipped with a heating means 2 having a cooling-water flow chamber. Cooling water emerges at 3 and flows through a header 4 either by way of a by-pass line 5 or by way of a line 8, cooler 10 and line 9 through a thermostat 6 and a cooling water pump 7 back to the engine 1. The heating means 2 is connected between venturis 11 and 12 in header 4 to a supply line 13 with interposed check valve 15 and a return line 14.

The heating means 2 is supplied with heated cooling water as long as the engine 1 is in the warm-up phase and the controlling thermostat valve 6 routes the cooling water through the by-pass 5. This generates a greater suction in the venturi 11 in connection 4a than in the venturi 12 in connection 4b of the header 4, causing the cooling water to circulate into supply line 13 to heating means 2 and thence into the return line 14 in the direction of arrows 16, opening the check valve 15. When the thermostat valve 6, owing to the rising temperature of the cooling water, routes most of the flow of cooling water through lines 8 and 9 and cooler 10, a greater suction is generated in venturi 12 than in venturi 11. Nevertheless, flow of cooling water through heating means 2 in the opposed direction 17 is prevented by the check valve 15, so that the heating means 2 is rendered ineffectual.

Since the direction of flow depends on the ratio or relative proportions of the suctions in venturis 11 and 12, the time of reversal may be determined at will.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A water-cooled combustion engine having a cooling water inlet and a cooling water outlet, a cooling water pump, a first cooling water circuit comprising a first line from said outlet to said inlet and a second cooling water circuit comprising a second line from said outlet to said inlet, a cooler in said first line, a thermostatic valve for closing said first circuit and opening said section circuit when the engine is cold, and vice versa when the engine is warm, the engine having an intake system with a heating means which comprises a cooling water flow chamber having a supply line connected to said first line upstream of the cooler and a return line connected to said second line and a non-return valve to prevent flow of cooling water from said return line through said flow chamber and supply line.

2. The invention in accordance with claim 1 wherein a first venturi having a suction nozzle is provided in said first line and a second venturi having a suction nozzle is provided in said second line with the supply line of the flow chamber being connected to the suction nozzle of the first venturi and the return line being connected to the suction nozzle of the second venturi.

3. The invention in accordance with claim 2 wherein a header is provided at the cooling water outlet of the engine with a connection for the first line leading to the cooler and a connection for the second line, both of the venturis being arranged in the two said connections.

* * * * *

UNITED STATES PATENT OFFICE
CERTIFICATE OF CORRECTION

Patent No. 3,937,197      Dated February 10, 1976

Inventor(s) Wolfgang Bihler

It is certified that error appears in the above-identified patent and that said Letters Patent are hereby corrected as shown below:

Col. 2, line 67, the word "section" should read --second--

Signed and Sealed this

Twenty-seventh Day of July 1976

[SEAL]

Attest:

RUTH C. MASON
*Attesting Officer*

C. MARSHALL DANN
*Commissioner of Patents and Trademarks*